(12) United States Patent
Powell

(10) Patent No.: US 6,440,382 B1
(45) Date of Patent: Aug. 27, 2002

(54) METHOD FOR PRODUCING WATER FOR USE IN MANUFACTURING SEMICONDUCTORS

(75) Inventor: Don Carl Powell, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/387,119

(22) Filed: Aug. 31, 1999

(51) Int. Cl.⁷ .................................................. C01B 5/00
(52) U.S. Cl. ................................... 423/580.1; 438/773
(58) Field of Search ........................ 438/773; 423/237, 423/580.1

(56) References Cited

U.S. PATENT DOCUMENTS

| | | | |
|---|---|---|---|
| 3,899,372 A | * 8/1975 | Esch et al. .......... | 148/DIG. 116 |
| 4,081,510 A | 3/1978 | Kato et al. | |
| 5,906,803 A | 5/1999 | Leppalahti | |
| 5,914,091 A | 6/1999 | Holst et al. | |
| 5,918,555 A | 7/1999 | Winegar | |
| 6,037,273 A | * 3/2000 | Gronet et al. ................ | 438/773 |

FOREIGN PATENT DOCUMENTS

EP  0878443 A1  11/1998

OTHER PUBLICATIONS

Cherkashin et al., "Losses of Platinum–Metal Catalyst During Vapor–Oxygen Oxidation of Ammonia", Brief Communications, Plenum Publishing Corporation, 1983, pp. 628–630.
Ueshima, et al., "New Technology For Selective Catalytic Oxidation of Ammonia To Nitrogen", Res. Chem. Intermed., vol. 24, 1988, pp. 133–141.
Ramis, et al., "Adsorption, Activation, and Oxidation of Ammonia over SCR Catalysts", Journal of Catalysis, vol. 157, 1995, pp. 523–535.
Atkins, P.W., *Physical Chemistry*, 1978, p. 819.
Shebeko, et al., "Investigation of Concentration Limits Of Flame Propagation In Ammonia–Based Gas Mixtures," Combustion, Explosion, and Shock Waves, vol. 33, No. 5, 1996 pp. 477–479.
van den Broek, et al., "Water–promoted ammonia oxidation by a platinum amine complex in zeolite HZSM–5 catalyst", Catalysis Letters vol. 55, 1998, pp. 79–82.

* cited by examiner

Primary Examiner—Olik Chaudhuri
Assistant Examiner—Ginette Peralta
(74) Attorney, Agent, or Firm—Knobbe, Martens, Olson & Bear, LLP

(57) ABSTRACT

Disclosed is a process of treating semiconductor substrates, including the production of pure water, a method of producing the pure water for semiconductor fabrication, and a water-producing apparatus. Ammonia is catalytically oxidized in a catalytic conversion reactor to form pure water. The water is then supplied to a semiconductor fabrication process. The water-producing apparatus comprises a housing surrounding a catalytic material for adsorbing ammonia, an ammonia and oxidant source, each in communication with the housing, and an outlet for reaction products. The outlet is connected to a semiconductor processing apparatus. According to preferred embodiments of the invention, the apparatus can be a catalytic tube reactor, a fixed bed reactor or a fluidized bed reactor. This process and apparatus allows the quantity of unreacted excess oxidant to be limited, preventing undesired oxidation of low oxidation resistant metal gate electrodes during semiconductor fabrication processes, such as during wet oxidation processes like source/drain reoxidation. At the same time, the use of ammonia reactants lessens the risk of dangerous explosions and excessive boron diffusion while fabricating surface p-channel semiconductor devices.

18 Claims, 8 Drawing Sheets

METHOD FOR PRODUCING WATER FOR USE IN MANUFACTURING SEMICONDUCTORS

BACKGROUND OF THE INVENTION

1. Field of the Invention

This invention relates generally to semiconductor fabrication. More specifically, the invention relates to producing water for use in the fabrication of semiconductors.

2. Description of the Related Art

Ultra-pure water plays an important role in the fabrication of semiconductors. One such role is the thermal oxidation of silicon, wherein a silicon dioxide ($SiO_2$) film is grown on a silicon substrate by oxidizing the surface of the silicon substrate. Thermal oxidation of silicon proceeds much faster in the presence of water. Thus, the advantages are shorter process time and oxidation at a lower temperature as compared to dry oxidation.

Other examples of uses of ultra-pure water during semiconductor fabrication include repairing gate oxide material damaged during plasma etching via source/drain reoxidation; forming of "hard" oxides or $SiO_xN_y$; accomplishing cell reoxidation of high dielectric materials; wet cleaning/wet etching; in situ chamber cleaning for furnace; LPCVD; PECVD; HDP processing chambers and etch chambers; plasma etching; removing organic material such as in photoresist "ash" applications; and forming silicon oxides or silicon oxynitrides in steam plasma systems.

Pure water is required in each of these fabrication processes to avoid contaminating the fine integrated circuit devices and wiring. As devices are continually scaled down, purity requirements become even more stringent and important to the fabrication of operable high-speed circuitry.

Accordingly, there is a need for an efficient and reliable process for producing water having a high degree of purity for use in semiconductor fabrication processes.

SUMMARY OF THE INVENTION

In accordance with one aspect of the invention, a process of treating semiconductor substrates, including the production of pure water, is disclosed. The process comprises catalytically oxidizing ammonia to form water. The water is then supplied to a semiconductor fabrication process.

In accordance with another aspect of the invention, a method of producing substantially pure water for semiconductor fabrication is disclosed. The method comprises introducing ammonia to a catalytic conversion reactor. The ammonia is then oxidized to form water.

In accordance with another aspect of the invention, an apparatus for producing water is disclosed. The water-producing apparatus comprises a housing surrounding a catalytic material for adsorbing ammonia, a source of ammonia in communication with the housing, a source of oxidant in communication with the housing, and an outlet for reaction products, wherein the outlet is connected to a semiconductor processing apparatus.

A preferred embodiment of the present invention is achieved by reacting, in a water-producing apparatus, ammonia with oxygen in the presence of catalytic material that adsorbs the ammonia and promotes a reactivity of the ammonia with the oxygen, such as metal oxides, ion-exchanged zeolites, noble metals, titanium dioxide, silicon dioxide, and combinations thereof, to form effectively nitrogen and water. The produced water is conveyed to a semiconductor fabrication process to be used by the same.

According to a number of embodiments of the invention, the water-producing apparatus can, for example, be a catalytic tube reactor, a fixed bed reactor or a fluidized bed reactor.

The preferred embodiments provide a method and apparatus for advantageously producing water for use in semiconductor fabrication processes without the risk of hydrogen explosions while permitting the production of low overall electrical resistance materials comprised of low oxidation-resistant metal gate electrodes while the semiconductor device is being fabricated. Moreover, the preferred embodiments advantageously do not subject a surface p-channel semiconductor device to excessive boron diffusion.

DETAILED DESCRIPTION OF THE INVENTION

Current methods for producing ultra-pure water for use in semiconductor fabrication include distillation and deionization. These methods, while effective, are slow and cumbersome, representing high costs. Moreover, the water produced by these methods tend to contain residual dissolved oxygen. Another manner of providing pure water is through catalytic conversion of hydrogen gas ($H_2$) and oxygen gas ($O_2$) which is traditionally conducted with an excess of $H_2$ or $O_2$ to prevent explosion.

Figure 1:
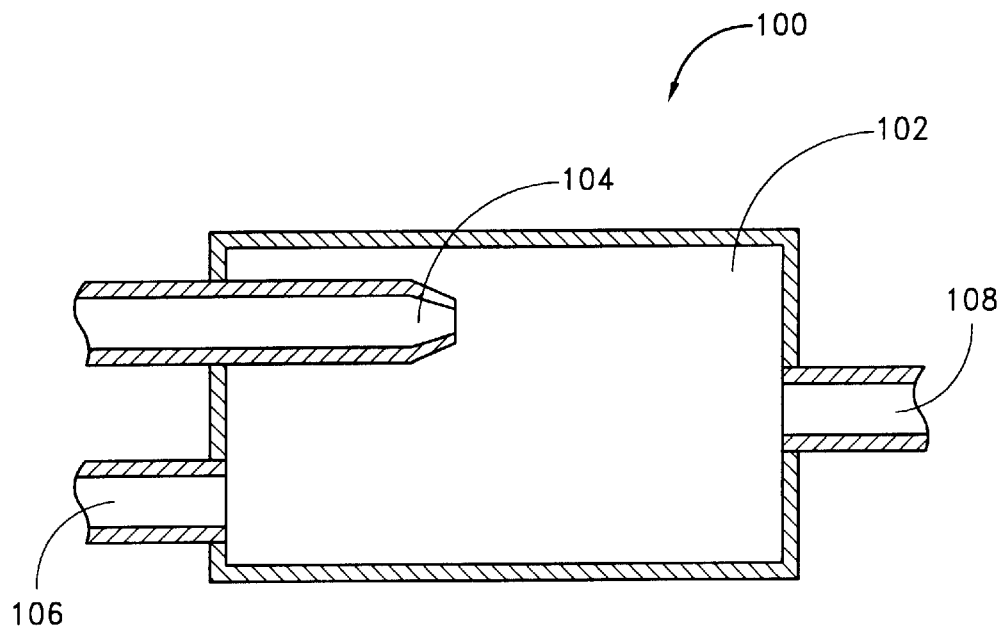
FIG. 1 is a side cross-sectional illustration of a combustion-pipe type apparatus for producing water for use in semiconductor fabrication.

FIG. 1 shows one combustion-pipe-type apparatus 100 that can be used to produce water for use in semiconductor fabrication. $H_2$ enters a quartz furnace 102 via a hydrogen gas nozzle 104. $O_2$ enters the quartz furnace 102 via an oxygen gas nozzle 106. The vicinity near a tip end of the hydrogen gas nozzle 104 inside the quartz furnace 102 attains a high temperature (e.g., 1,800° C. to 2,000° C.) due to flames of combustion from a heater (not illustrated) that heats this area. Water vapor produced by the combustion exits the quartz furnace 102 via an outlet 108.

Figure 2:
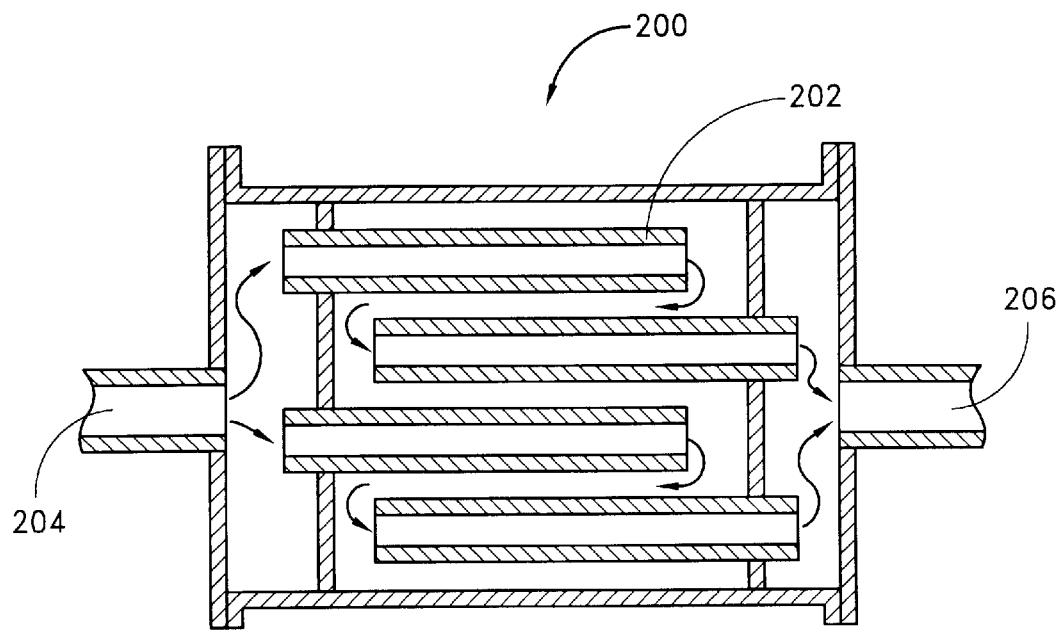
FIG. 2 is a side cross-sectional illustration of a catalytic apparatus for producing water for use in semiconductor fabrication.
Figure 3:
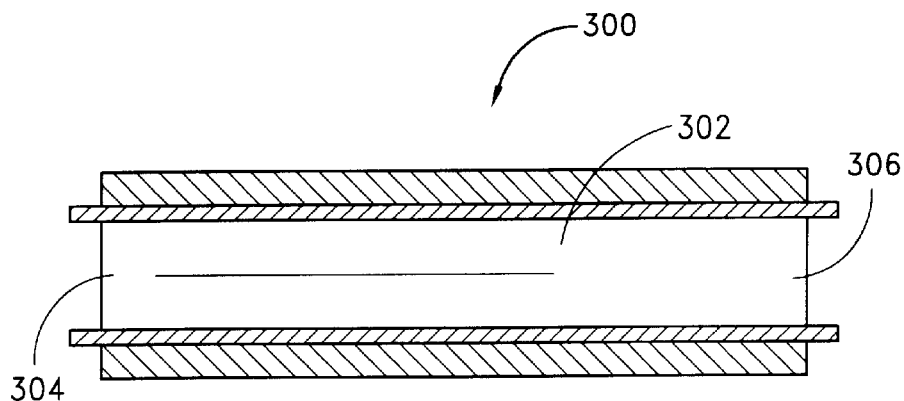
FIG. 3 is a side cross-sectional illustration of another catalytic apparatus for producing water for use in semiconductor fabrication.
Figure 4:
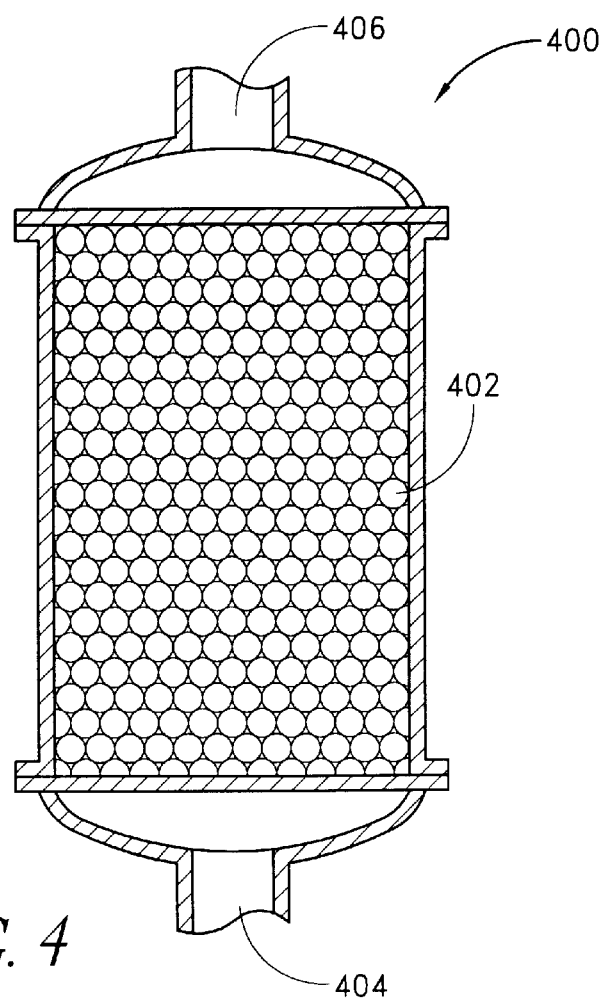
FIG. 4 is a side cross-sectional illustration of still another catalytic apparatus for producing water for use in semiconductor fabrication.

FIGS. 2 through 4 illustrate catalyst-reaction-type apparatuses that can be used to produce water via $H_2$ and $O_2$ for use in semiconductor fabrication. In FIG. 2, a water-producing apparatus 200 includes a plurality of pipes 202 made of material that serves as a catalyst to encourage hydrogen or oxygen reactivity. A mixture of $H_2$ and $O_2$ is introduced into the water-producing apparatus 200 via an inlet 204. Water produced by catalysis exits the water-producing apparatus 200 via an outlet 206.

In FIG. 3, a water-producing apparatus 300 includes a plurality of supported plates 302 made of catalytic material. A mixture of $H_2$ and $O_2$ is introduced into water-producing apparatus 300 via an inlet 304 and contacts the plates 302. Water produced by catalysis exits the water-producing apparatus 300 via an outlet 306.

In FIG. 4, a water-producing apparatus 400 includes a plurality of particulate elements 402 made of catalytic material. A mixture of $H_2$ and $O_2$ is introduced into water-producing apparatus 400 via an inlet 404 and contacts the particulate elements 402. Water produced by catalysis exits the water-producing apparatus 400 via an outlet 406. The water-producing apparatus 400 in FIG. 4 is illustrated as a fixed bed reactor, but it may be a fluidized bed reactor.

However, one problem with the known methods illustrated in FIGS. 1 through 4 is that the use of hydrogen and hydrogen/oxygen mixture gases presents a high risk of explosion, endangering the safety of technicians, the in-process semiconductor product and the tool itself. Uses of diluting gases, such as argon, to decrease the risk of dangerous hydrogen explosions lowers the overall rate of water producing reaction, extending processing times and increasing the size of the water-producing apparatus, ultimately increasing the cost of producing the pure water. Moreover, even if hydrogen and oxygen are provided in ratios to completely react, the product gas is a mixture gas of water and argon, rather than pure water. Another problem is that any excess hydrogen causes increased boron diffusion during thermal processing phases in excess of 650° C., which are common in semiconductor fabrication.

Because of the disadvantages posed by the use of hydrogen in the production of water with respect to semiconductor fabrication, the hydrogen reactant is typically arranged to be completely oxidized. As a result, these methods do not allow for precise control of the concentration of excess, unreacted oxygen. Precise control of excess oxygen is important in a number of semiconductor fabrication processes, including selective oxidation of silicon in the presence low oxidation-resistant metal gate electrodes, such as tungsten (W), cobalt (Co), molybdenum (Mo), titanium (Ti) and platinum (Pt). The oxidation of exposed, oxidizable metal gate electrodes form oxides that are insulating and thus detract from electrode conductivity, rendering a slower and less responsive device. Some metals, such as tungsten are so readily oxidized that overall resistance is increased beyond tolerable levels, rendering them impractical for use as gate electrode metals.

Accordingly, a need exists for processes for producing water for use in semiconductor fabrication, which minimizes the risk of oxidizing metal gates while reducing the risk of hydrogen explosions and excessive boron diffusion.

Figure 5:
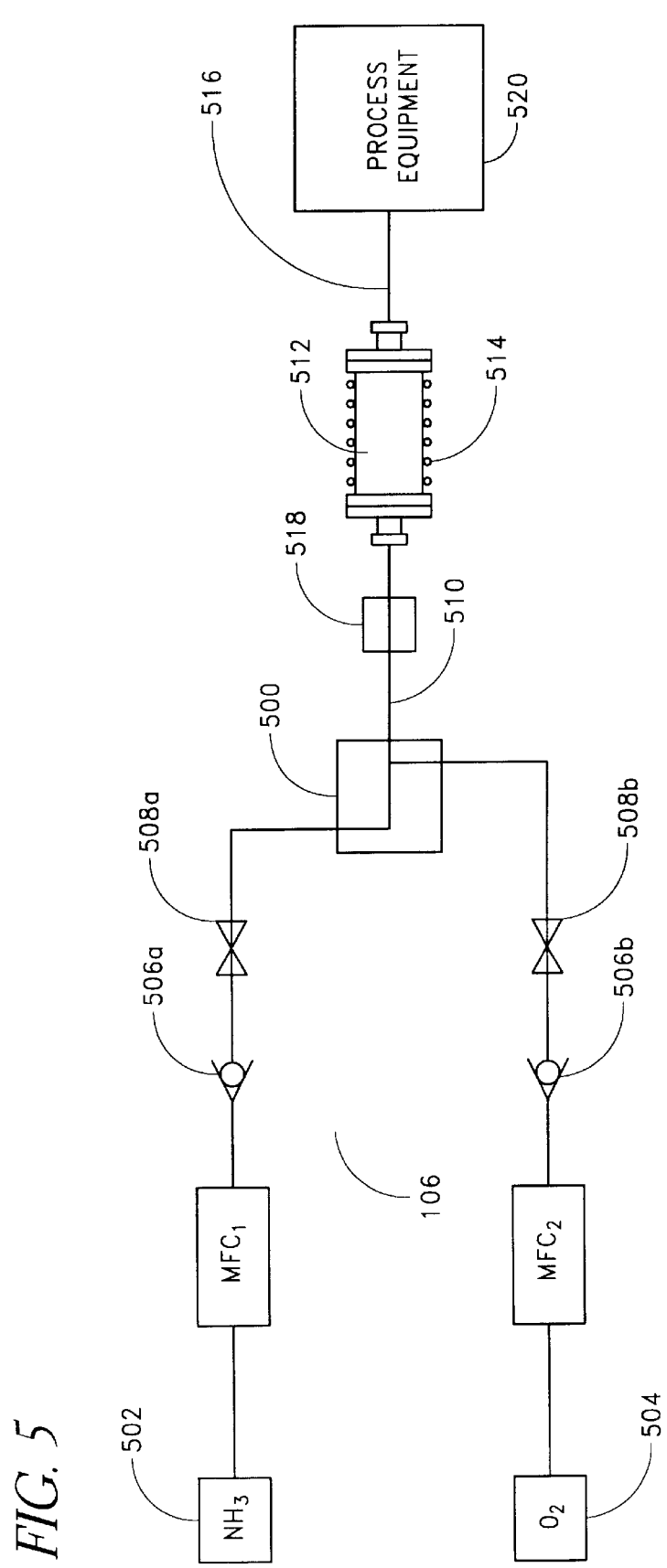
FIG. 5 is a system block diagram showing an embodiment of the method of producing water and using the water in a semiconductor fabrication process in accordance with the invention.

FIG. 5 is a block diagram showing a system for producing water in accordance with a preferred embodiment of the invention. Ammonia gas ($NH_3$) is supplied to a mixing section 500 via an ammonia gas line 502. An oxidant is supplied to the mixing section 500 via a gas line 504. The mixing section 500 may simply be a regular in-pipe gas mixing system or a gas mixing mechanism designed to discharge ammonia gas into the oxidant gas in a swirling stream to uniformly mix the reactant gases.

The molar ratio of ammonia to oxidant gas can be set and altered using mass flow controllers 506a and 506b and valves 508a and 508b. The ammonia gas and oxidant gas mixture is preferably supplied via a common inlet line 510 into a water-producing apparatus 512. The water-producing apparatus 512 of various embodiments is depicted in greater detail in FIGS. 9 through 11.

In the illustrated embodiment, the oxidant gas comprises oxygen ($O_2$) gas. An ammonia and oxygen gas mixture is catalytically converted into reaction products comprising nitrogen gas $N_2$, water vapor $H_2O$, any excess oxygen gas or ammonia gas, and nitrogen-based oxides, according to the following equation:

$$4NH_3 + 3O_2 \rightarrow 6H_2O + 2N_2 + aN_xO_y \qquad (1)$$

A preferred mole ratio of ammonia to oxygen ranges from about 1:9 to about 9:1. The resultant reaction products can include water, nitrogen, any excess unreacted ammonia and oxidant, and nitrogen-based oxides. More preferably, excess ammonia is supplied to the water-producing apparatus 512, i.e., greater than a 4:3 ammonia to oxygen mole ratio, so as to render the quantity of unreacted excess oxygen in the reaction products negligible. An ammonia to oxygen mole ratio of between about 5:3 and 14:3 is most preferable. Accordingly, excess oxygen is avoided, thereby minimizing the risk of oxidizing metal elements exposed to the process to which the water is fed. In particular, metal layers in transistor gate stacks, particularly tungsten, are not subjected to excess oxygen gas. Desirably, the ratio of water to byproducts such as nitrogen and nitric oxide is also kept low. In particular, the ratio of water to nitrogen is preferably about 6:2 (in accordance with the above Equation (1)), while the ratio of water to nitric oxide is preferably less than about 1:1.

Performing the reaction shown in Equation (1), rendering the amount of post-reaction, unreacted oxygen species to a negligible quantity, advantageously lowers the risk of undesired oxidation of oxidation-susceptible metal gate electrodes during subsequent wet fabrication processes, such as wet thermal oxidation of silicon substrates. However, excess unreacted ammonia does not pose as high a danger as excess unreacted hydrogen of explosion or excessive boron diffusion during thermal treatments at greater than about 650° C. such as during source/drain anneals.

The catalytic material used to carry out the oxidation of ammonia shown in Equation (1) preferably activates the ammonia by strong adsorption over the catalyst and lowers the activation energy needed to produce water from ammonia and oxygen. More preferably, the catalytic material comprises one or a combination of metallic materials, such as palladium, (Pd), copper (Cu), platinum (Pt), vanadium oxide ($V_2O_5$), tungsten oxide ($WO_3$), ion-exchanged zeolites (e.g., HZSM-5), titanium dioxide ($TiO_2$), and silicon dioxide ($SiO_2$). Most preferably, the catalytic material comprises platinum or a platinum/palladium alloy. Materials suitable for catalytic oxidation of ammonia are further discussed in A. C. M. van den Broek, J. van Grondelle and R. A. van Santen, Water-Promoted Ammonia oxidation by a Platinum Amine Complex in Zeolite HZSM-5 Catalyst, Catalysis Letters 55: 79–82 (1998) and M. Ueshima, K.

Sano, M. Ikeda, K. Yoshino and J. Okamura, New Technology for Selective Catalytic Oxidation of Ammonia to Nitrogen, Res. Chem. Intermed. 24: 133–141 (1998), the disclosure of which is incorporated herein by reference.

A heater 514 placed around the water-producing apparatus 512 preferably maintains a reaction temperature from about 25° C. to about the explosive temperature of the ammonia and oxidant gas mixture, taking into account their respective concentrations and pressure. A more preferred reaction temperature is from about 350° C. to about 410° C. When the reaction temperature is lower than about 180° C., the reaction speed is undesirably low, and as a result, in order to obtain a sufficient decomposition ratio of ammonia gas, a space velocity of the ammonia/oxidant mixture gas in a catalytic reaction zone has to be lowered, making the water production process less economical. When the reaction temperature exceeds about 600° C., nitrogen oxides in the outlet 516 are undesirably high and can effect consumption of the catalyst.

A preferred gas pressure for the water-producing apparatus 512 is selected from about $10^{-8}$ torr to a pressure not exceeding one that would transition the produced water into the liquid phase for a particular process condition. A more preferred gas pressure at the inlet 510 ranges from about 350 Torr to about 1,000 Torr, i.e., roughly in the atmospheric order of magnitude.

In the illustrated embodiment, the mixture of ammonia and oxidant are supplied to the water-producing apparatus 512 in a gaseous form, but it will be understood that, in other arrangements, liquified ammonia and liquified oxidant could also be supplied. Furthermore, while in the illustrated embodiment the ammonia gas and oxygen gas are premixed at the mixing section 500 then supplied to the water-producing apparatus 512, the skilled artisan will readily appreciate that it is also possible to supply ammonia gas and oxygen gas independently to the water-producing apparatus 512, and to mix them in the water-producing apparatus 512.

Optionally, a preheating section 518 can be provided along the inlet line 510 to the water-producing apparatus 512, and the mixture gas can be preheated therein. By providing the mixture gas preheating section 518 along the inlet line 510, even under conditions in which there is not a sufficient temperature or flow rate, it is made possible to effectively prevent production of unreacted gas.

The reaction products exit the water-producing apparatus 512 via an outlet line 516 and preferably enter a process equipment 520 which enables the water vapor to be conveyed to and used in semiconductor fabrication processes. For example, process equipment 520 can include selective catalytic reduction (SCR) equipment whereby the nitrogen-based oxides are removed from the outline line 516 or condensing equipment whereby produced water vapor is condensed to liquid water to be used in rinsing of semiconductor devices. In an alternative embodiment, process equipment 520 can itself be semiconductor fabrication process equipment, the nature of which is described in further detail with respect to FIG. 6.

Figure 6:
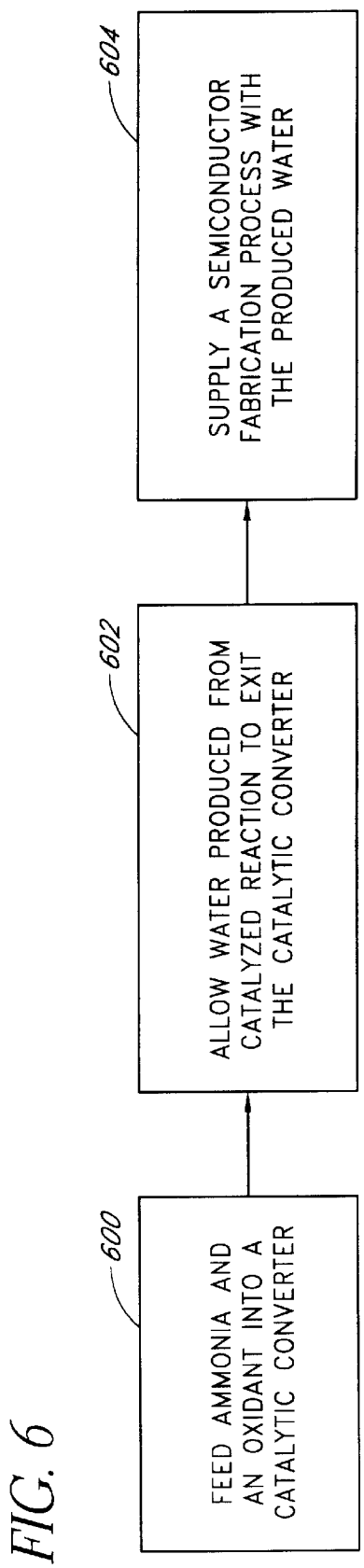
FIG. 6 is a flow chart showing a method of producing water and supplying the water to a semiconductor fabrication process in accordance with the present invention.

FIG. 6 is a flow chart showing a method of producing water and supplying the water to a semiconductor fabrication process in accordance with the present invention. In block 600, ammonium and an oxidant is fed into a catalytic converter. Preferred embodiments of the catalytic converter comprise a catalytic tube reactor, a fixed bed reactor, or a fluidized bed reactor. In block 602, water produced from the catalyzed reaction between the ammonia and the oxidant exits the catalytic converter. In block 604, the water enters a semiconductor fabrication process. The semiconductor fabrication process is preferably a process of wet oxidation (such as wet thermal oxidation of silicon substrates, source/drain reoxidation and reoxidation of high dielectric materials), wet formation of silicon oxides, nitrides, or oxynitrides, wet bench processing of semiconductor substrates, wet etching, cleaning (such as for furnace, LPCVD, PECVD, and HDP processing chambers and etch chambers), removing organic material, or combinations or these.

Figure 7:
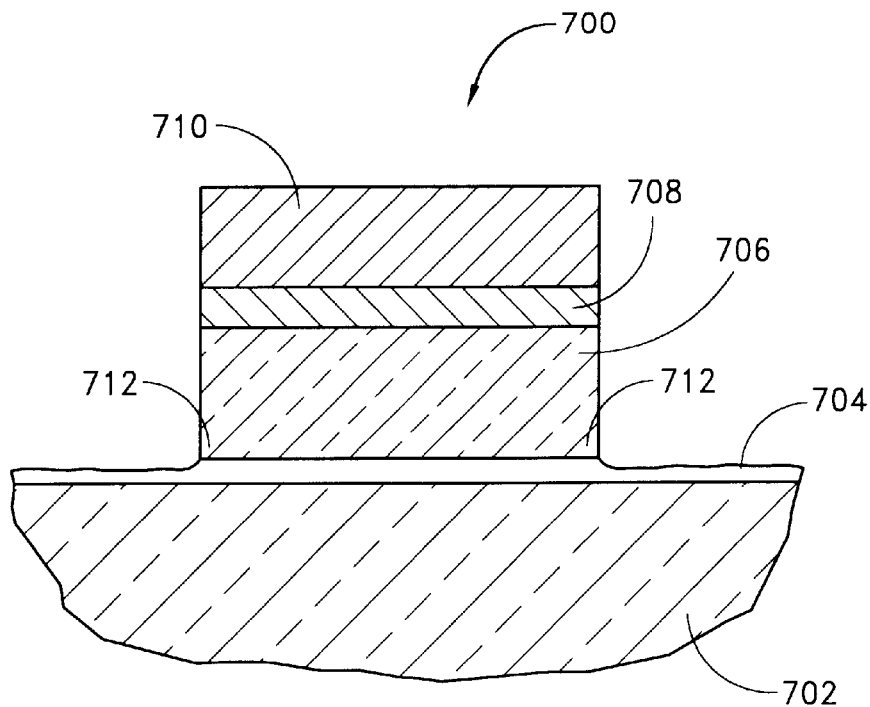
FIGS. 7–8 are partial, cross-sectional representations of a partially fabricated integrated circuit, generally illustrating source/drain reoxidation in accordance with the prior art.

In the most preferred embodiment, the reaction products are fed directly to an oxidation furnace or RTP tool, in which source/drain reoxidation of semiconductor layers is performed. Source/drain reoxidation serves to repair plasma etch damage to a gate dielectric at the corners of the gate dielectric in order to reduce hot carrier injection into the gate dielectric. FIG. 7 illustrates a closer view of a gate electrode 700, which has been grown out of a single-crystal silicon substrate 702, and physical damage (thinning) resulting from gate oxide 704 exposure to the plasma etch. Generally, the gate electrode 700 comprises a patterned gate polysilicon layer 706, silicide layer 708, and metal straps 710, as shown. Damage to the gate oxide 704 caused by plasma etching may induce punchthrough or tunneling current leakage, particularly at or near edges 712 of the gate electrode 700. In turn, junction leakage results in increased threshold voltage and unreliable circuit operation.

It should be understood that damage to the chemical integrity of the gate oxide 704 also takes place as a result of photon-assisted and other damage during the ion bombardment generally required for anisotropic etching. Etch damage may also extend to the underlying silicon substrate. Aside from the illustrated physical thinning, plasma etching tends to damage oxide bonds, creating charge trap sites. Such structural damage extends laterally under the gate edges 712 as well as over source/drain regions.

Figure 8:
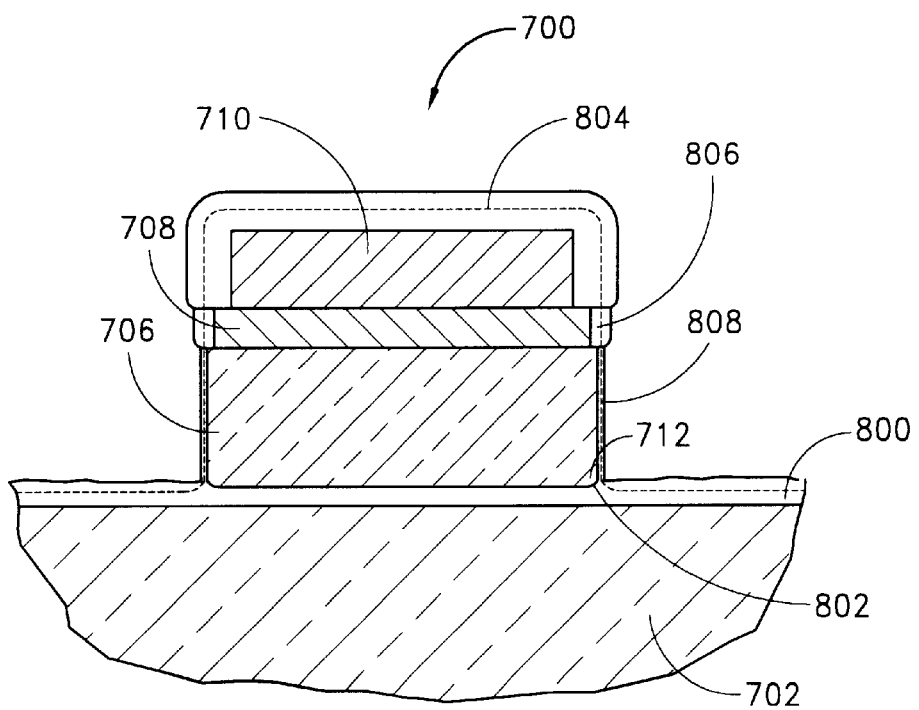

Typically, the source/drain reoxidation step involves wet oxidation at temperatures above 800° C. for a relatively long period (more than 30 minutes). FIG. 8 illustrates the gate electrode 700 after source/drain reoxidation, showing a reoxidized gate oxide 800 with a slight bird's beak 802 under the gate corner 712. The thickened bird's beak 802 serves to round the gate corners 712 and reduce lateral electric field strength in active areas adjacent the gate, thereby reducing hot electron injection to the gate oxide 800 during transistor operation.

Unfortunately, the presence of an oxidant, such as oxygen, during source/drain reoxidation contributes to oxidation of exposed gate materials, as shown in FIG. 8. Thus, for the illustrated example, a layer of tungsten oxide 804 forms around the tungsten metal strap 710. Similarly, an oxide layer 806 comprised substantially of tungsten oxide ($WO_2$) and silicon oxide ($SiO_2$) form around the silicide strap 708, while a thin layer of silicon oxide 808 grows out of the gate polysilicon 706.

The oxides formed in consumption of the metal are insulating and so unable to contribute to word line conductivity. Thus, overall resistance may be radically increased by excess oxygen during source/drain reoxidation. Some metals, such as titanium or titanium nitride are so readily oxidized that overall resistance is increased beyond tolerable levels, rendering such metals for use in gate materials. By using ammonia, the present invention can produce water for use in source/drain reoxidation under lean oxidant conditions, most preferably such that the oxidant is completely reacted. As a result, the risk of undesired oxidation of low oxidation-resistant metal gate electrodes is advantageously lowered.

Figure 9:
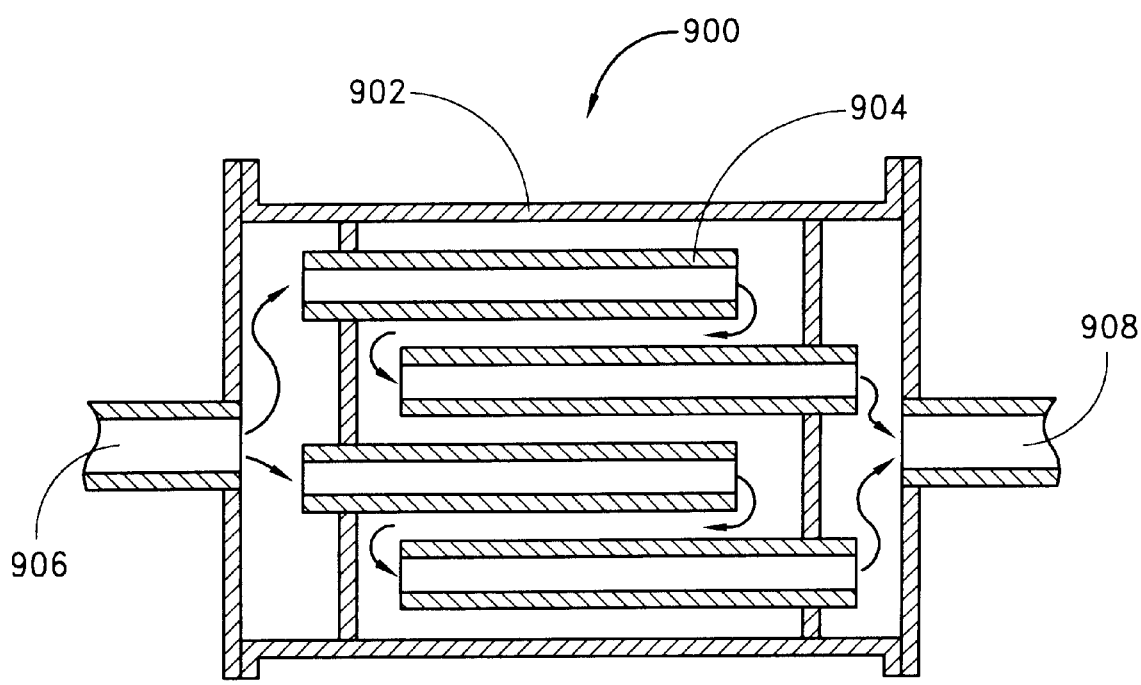
FIG. 9 is a partial, cross-sectional view of a catalytic tube reactor, illustrating a first embodiment of a water-producing apparatus in accordance with the invention.
Figure 10:
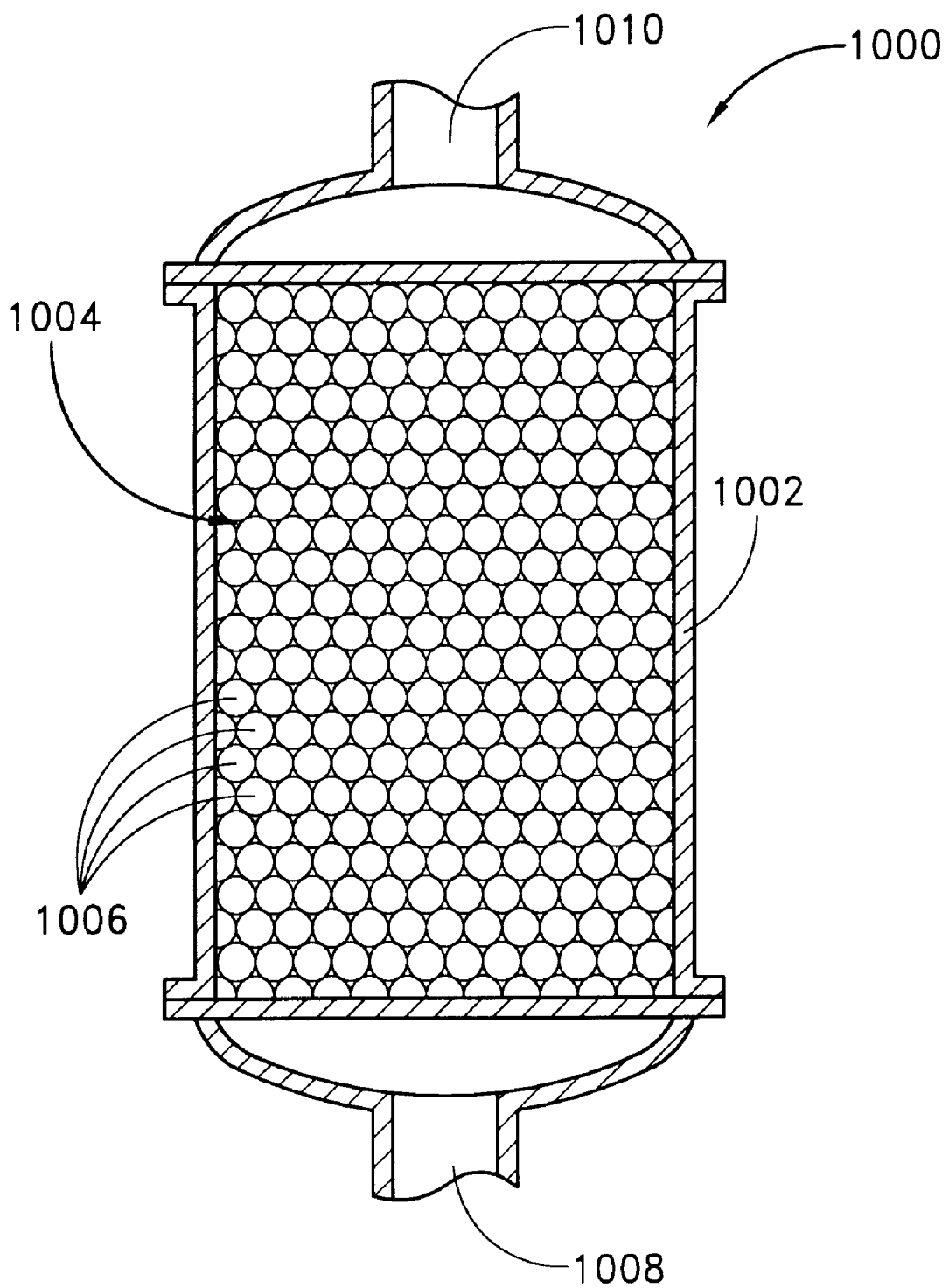
FIG. 10 is a partial, cross-sectional view of a packed bed reactor, illustrating a second embodiment of the water-producing apparatus in accordance with the invention.
Figure 11:
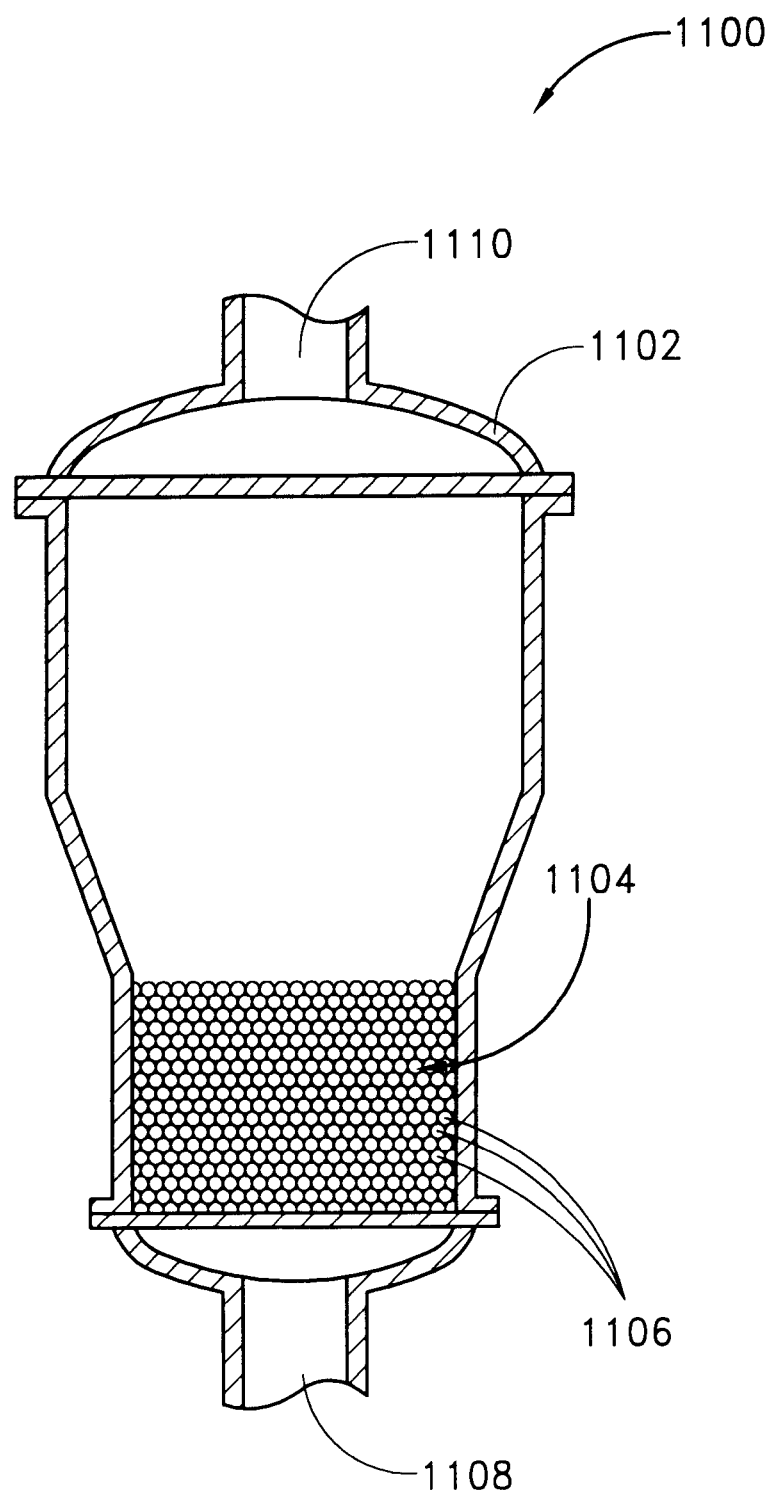
FIG. 11 is a partial, cross-sectional view of a fluidized bed reactor, illustrating a third embodiment of the water-producing apparatus in accordance with the invention.

The preferred embodiments of the water-producing apparatus of FIG. 5 are shown in FIGS. 9 through 11.

First Embodiment

FIG. 9 is a partial, cross-sectional view of a catalytic tube reactor 900, illustrating a first embodiment of the present invention. The illustrated reactor 900 preferably comprises a heat-resistant, corrosion-resistant alloy housing 902, such as Hastelloy™, that houses a plurality of pipes 904 made of the preferred catalytic material. The pipes 904 desirably activate the ammonia reactivity. Preferably, both inner and outer surfaces of the catalytic pipes 904 serve as catalysts. The catalytic pipes 904 preferably have an end diameter between about 1 cm and about 2 cm and a length between about 20 cm and about 30 cm. The skilled artisan will appreciate, however, that these surfaces can be optimized depending upon the desired production rates.

An inlet stream 906, comprising a mixture of ammonia gas and oxygen gas, enters the reactor 900 and reacts upon the surfaces of the catalytic pipe 904 to form an effluent stream 908. The effluent stream 908 can include water vapor, nitrogen gas, nitrogen-based oxides, and any unreacted ammonia, all of which exit the reactor 900.

A preferred gas pressure for the reactor 900 is selected from about $10^{-8}$ torr to a pressure not exceeding one that would transition the produced water into the liquid phase for a particular process condition. A more preferred gas pressure at the inlet 906 ranges from about 350 Torr to about 1,000 Torr.

Second Embodiment

FIG. 10 is a partial, cross-sectional view of a packed bed reactor 1000, illustrating a second embodiment in accordance with the present invention. The packed bed reactor 1000 preferably comprises a heat-resistant, corrosion-resistant alloy housing 1002, such as Hastelloy™, that houses a bed 1004 of particles 1006. The particles 1006 are preferably made of the preferred catalytic material. The particles 1006 preferably range in diameter from about 5 mm to about 10 mm. An inlet stream 1008, comprising a mixture of ammonia and an oxidant, enters the reactor 1000 and reacts with the catalytic particles 1006 to form an effluent stream 1010. The effluent stream 1010 can include water vapor, nitrogen gas, nitrogen-based oxides, and any unreacted ammonia, all of which exit the reactor 1000.

A preferred gas pressure for the reactor 1000 is selected from about $10^{-8}$ torr to a pressure not exceeding one that would transition the produced water into the liquid phase for a particular process condition. A more preferred gas pressure at the inlet 708 ranges from about 500 Torr to about 1,150 Torr.

The skilled artisan will recognize other methods of increasing catalytic surface area of the particles 1006. For example, the particle 1006 may comprise a granule, sintered material, thin sheet laminate, honeycomb body, mesh body, sponge body, or fin-shape body whose surfaces are covered with the preferred catalytic material.

Moreover, while in the illustrated embodiment reactor 1000 is shown as a packed bed, column reactor, the skilled artisan will readily appreciate that reactor 1000 could also be a continuous, fixed bed tubular reactor (not illustrated).

Third Embodiment

FIG. 11 is a partial, cross-sectional view of a fluidized bed reactor 1100, illustrating a third embodiment in accordance with the present invention. The fluidized bed reactor 1100 preferably comprises a heat-resistant, corrosion-resistant alloy housing 1102, such as Hastelloy™, that houses a bed 1104 of particles 1106. The particles 1106 are preferably made of the preferred catalytic material. The particles 1106 preferably have a diameter from about 3 mm to about 5 mm. An inlet stream 1108, comprising a mixture of ammonia and an oxidant enters the reactor 1100 and reacts with the catalytic particles 1106 to form an effluent stream 1110. The effluent stream 1110 can include water vapor, nitrogen gas, nitrogen-based oxides, and any unreacted ammonia, all of which exit the reactor 1100.

A preferred gas pressure for the reactor 1100 is selected from about $10^{-8}$ torr to a pressure not exceeding one that would transition the produced water into the liquid phase for a particular process condition. A more preferred gas pressure at the inlet 1108 ranges from about 700 Torr to about 1,350 Torr.

Using ammonia, rather than hydrogen, as a reactant species to produce water for use in semiconductor fabrication processes advantageously allows the water-production process to be performed under lean oxidant conditions, most preferably such that the oxidant is completely reacted. The risk of undesired oxidation of low oxidation-resistant metal gate electrodes during subsequent wet fabrication processes, such as source/drain reoxidation, is advantageously lowered. However, excess unreacted ammonia, which is a product of limiting the quantity of excess unreacted oxidant, does not pose as high a danger of explosion or boron diffusion, as compared to excess unreacted hydrogen.

The invention may be embodied in other specific forms without departing from its spirit or essential characteristics. With reference to the information above, a myriad of alternative embodiments which are within the scope of the invention will be readily apparent to one skilled in the art, such as the simple re-arrangement of the blocks shown in FIG. 5. For example, in the illustrated embodiment the mixing section 500 precedes the preheating section 518. However, a skilled artisan will recognize that the preheating section 518 may be incorporated into the mixing section 500 or even precede the mixing section 500.

The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

I claim:

1. A process of treating semiconductor substrates, including the production of pure water, the process comprising:
   catalytically oxidizing ammonia to form water, wherein said catalytic oxidation comprises adsorbing ammonia on a catalytic material to promote reactivity of said ammonia with an oxidant; and
   supplying said water to a semiconductor fabrication process.

2. A process according to claim 1, wherein said oxidant comprises oxygen gas.

3. A process according to claim 1, wherein said catalytic material is selected from the group consisting of metals, metal oxides, ion-exchanged zeolites, titanium dioxide, silicon dioxide, and combinations thereof.

4. A process according to claim 1, wherein said catalytic oxidation takes place in a catalytic tube reactor comprising a surface of the catalytic material.

5. A process according to claim 1, wherein said catalytic oxidation takes place in a fixed bed reactor containing a plurality of particles comprising surfaces of the catalytic material.

6. A process according to claim 5, wherein said particles are selected from the group consisting of granules, particles, sintered material of powders or fibers, thin sheet laminates or honeycomb bodies, mesh bodies, sponge bodies, fin-shaped bodies, and a combination thereof.

7. A process according to claim 5, wherein said particles are no greater than about 5 mm in size.

8. A process according to claim 1, wherein said catalytic oxidation takes place in a fluidized bed reactor containing a plurality of particles comprising a surface of the catalytic material.

9. A process according to claim 8, wherein said particles are equal or less than about 5 mm in size.

10. A process of treating semiconductor substrates, including the production of pure water, the process comprising:

catalytically oxidizing ammonia to form water; and supplying said water to a semiconductor fabrication process, wherein said semiconductor fabrication process comprises plasma etching.

11. A process according to claim 10, wherein said semiconductor fabrication process comprises process chamber cleaning.

12. A process according to claim 10, wherein said semiconductor fabrication process comprises removing organic material.

13. A process of treating semiconductor substrates, including the production of pure water, the process comprising:

catalytically oxidizing ammonia to form water; and supplying said water to a semiconductor fabrication process, wherein said semiconductor fabrication process comprises forming silicon oxides or silicon oxynitrides in steam plasma systems.

14. A process according to claim 13, wherein said semiconductor fabrication process comprises converting $Si_xN_y$ to $Si_xN_yO_z$ where $0 \leq y < 4$.

15. A method of producing pure water for semiconductor fabrication, comprising introducing ammonia to a catalytic conversion reactor, and oxidizing said ammonia to form water, wherein said catalytic reactor comprises a plurality of tubes having catalytic surfaces, upon which ammonia adsorbs.

16. A method of producing pure water for semiconductor fabrication, comprising introducing ammonia to a catalytic conversion reactor, and oxidizing said ammonia to form water, wherein said catalytic reactor comprises a fixed bed reactor having a plurality of particles upon which said ammonia adsorbs.

17. A method of producing pure water for semiconductor fabrication, comprising introducing ammonia to a catalytic conversion reactor, and oxidizing said ammonia to form water, wherein said catalytic reactor comprises a fluidized bed reactor.

18. A method of producing pure water for semiconductor fabrication, comprising introducing ammonia to a catalytic conversion reactor, and oxidizing said ammonia to form water, the method further comprising:

condensing water vapor produced by said oxidation; and supplying said condensed water to a wet bench processing apparatus.

* * * * *

UNITED STATES PATENT AND TRADEMARK OFFICE
CERTIFICATE OF CORRECTION

PATENT NO. : 6,440,382 B1  Page 1 of 1
DATED : August 27, 2002
INVENTOR(S) : Don Carl Powell It is certified that error appears in the above-identified patent and that said Letters Patent is hereby corrected as shown below:

Column 6,
Line 14, please delete "comers", and insert -- corners. --
Line 42, please delete "comers", and insert -- corners. --

Signed and Sealed this

Twenty-ninth Day of July, 2003

JAMES E. ROGAN
*Director of the United States Patent and Trademark Office*